United States Patent
Zumberge

(10) Patent No.: US 7,726,748 B2
(45) Date of Patent: Jun. 1, 2010

(54) LOW FORCE LEVEL DETECTION SYSTEM AND METHOD

(76) Inventor: Jon T. Zumberge, 1789 Weathered Wood Trail, Dayton, OH (US) 45459

( * ) Notice: Subject to any disclaimer, the term of this patent is extended or adjusted under 35 U.S.C. 154(b) by 261 days.

(21) Appl. No.: 11/235,392

(22) Filed: Sep. 26, 2005

(65) Prior Publication Data

US 2007/0068237 A1   Mar. 29, 2007

(51) Int. Cl.
*B60T 8/60* (2006.01)
(52) U.S. Cl. .................. 303/155; 188/1.11 L; 188/158
(58) Field of Classification Search ............... 303/20, 303/155; 188/1.11 W, 1.11 L, 71.7, 71.8, 188/71.9, 72.7, 72.8, 156, 157, 158
See application file for complete search history.

(56) References Cited

U.S. PATENT DOCUMENTS

| | | | |
|---|---|---|---|
| 6,206,482 B1 * | 3/2001 | Campau et al. ............... | 303/20 |
| 6,279,694 B1 * | 8/2001 | Bohm et al. ................ | 188/162 |
| 6,435,160 B2 * | 8/2002 | Round et al. ................ | 123/399 |
| 6,464,308 B2 * | 10/2002 | Kubota ........................ | 303/20 |
| 6,655,507 B2 * | 12/2003 | Miyakawa et al. .......... | 188/156 |
| 6,848,756 B2 * | 2/2005 | Maron et al. ................ | 303/155 |
| 6,896,112 B2 * | 5/2005 | Berger et al. ............... | 192/52.4 |
| 2005/0035653 A1 * | 2/2005 | Godlewsky et al. .... | 303/122.03 |
| 2007/0085414 A1 * | 4/2007 | Henry et al. ................... | 303/3 |
| 2007/0126281 A1 * | 6/2007 | Zumberge ...................... | 303/3 |

FOREIGN PATENT DOCUMENTS

WO    WO 02101258 A2 * 12/2002
WO    WO 03080415 A1 * 10/2003

* cited by examiner

*Primary Examiner*—Thomas J Williams
(74) *Attorney, Agent, or Firm*—Dickinson Wright, PLLC

(57) ABSTRACT

A method for estimating a force exerted by a first body onto a second body including the steps of providing a motor having at least one detectable motor signal, wherein the motor is adapted to advance the first body into engagement with the second body, determining a first value for the motor signal prior to the first body engaging the second body, determining a second value for the motor signal after the first body engages the second body, and generating a force value based upon a comparison of the second value to the first value.

7 Claims, 2 Drawing Sheets

LOW FORCE LEVEL DETECTION SYSTEM AND METHOD

The low force level detection system and method was created during the performance of a cooperative research and development agreement with the Department of the Air Force (Contract No. F33615-03-2308 P00002). Therefore, the government of the United States may have certain rights to the low force level detection system and method.

BACKGROUND

The low force level detection system and method relates to systems and methods for detecting force and, more particularly, systems and methods for detecting low force levels in electromechanical brake systems.

Electromechanical brake systems typically include a housing, a rotor, brake pads, an actuator/caliper and a motor. The actuator is adapted to drive the brake pads into engagement with the rotor, thereby clamping the rotor between the pads. The motor drives the actuator into engagement with the brake pads and the rotor. Therefore, the amount of force applied to the rotor by the brake pads is a function of the distance that the actuator is advanced by the motor.

Prior art systems attempt to detect the position of the actuator at the onset of force (i.e., the point of initial contact). Then, assuming that the brake system can be modeled as a spring, the braking force may be calculated using Hooke's law:

$$F_0 = k(x_0 - x_i) \quad \text{(Eq. 1)}$$

wherein $F_0$ is the braking force, k is the spring function of the system, $x_i$ is the position of the actuator at the onset of force and $x_0$ is the position of the actuator at a subsequent time.

Such prior art systems attempt to detect the actual contact point. However, at the onset of force, the signal to noise level of the distinguishable signals is small and difficult to use. Therefore, such systems often encounter difficulty identifying the point at which contact is made and/or force is applied, thereby giving rise to inaccurate measurements of braking force.

Accordingly, there is a need for an improved system and method for estimating the contact force between two bodies.

SUMMARY

In one aspect, a method for estimating a force exerted by a first body onto a second body is provided. The method may include the steps of providing a motor having at least one detectable motor signal, wherein the motor is adapted to advance the first body into engagement with the second body, determining a first value for the motor signal prior to the first body engaging the second body, determining a second value for the motor signal after the first body engages the second body, and generating a force value based upon a comparison of the second value to the first value.

In another aspect, a brake system is provided. The brake system may include a rotor, an actuator aligned to engage the rotor, a motor adapted to advance the actuator into engagement with the rotor, the motor generating at least one detectable motor signal, at least one sensor positioned to monitor the motor signal, and a processor in communication with the sensor, the processor being adapted to determine a first value of the motor signal prior to the actuator engaging the rotor and a second value of the motor signal after the actuator engages the rotor and generating a force value based upon a comparison of the second value to the first value.

In another aspect, a method for estimating a clamping force between brake pads and a rotor is provided, wherein the brake pads are urged into engagement with the rotor by a motor having at least one detectable motor signal. The method may include the steps of monitoring a motor signal of the motor, the motor signal including at least one of a motor speed, a motor current, a commutation time between motor position pulses and estimates thereof, determining a first value for the motor signal prior to the brake pads engaging the rotor, determining a second value for the motor signal after the brake pads engage the rotor, and determining a clamping force value based upon a comparison of the second value to the first value.

Other aspects of the low force level detection system and method will become apparent from the following description, the accompanying drawings and the appended claims.

DETAILED DESCRIPTION

Figure 1A:
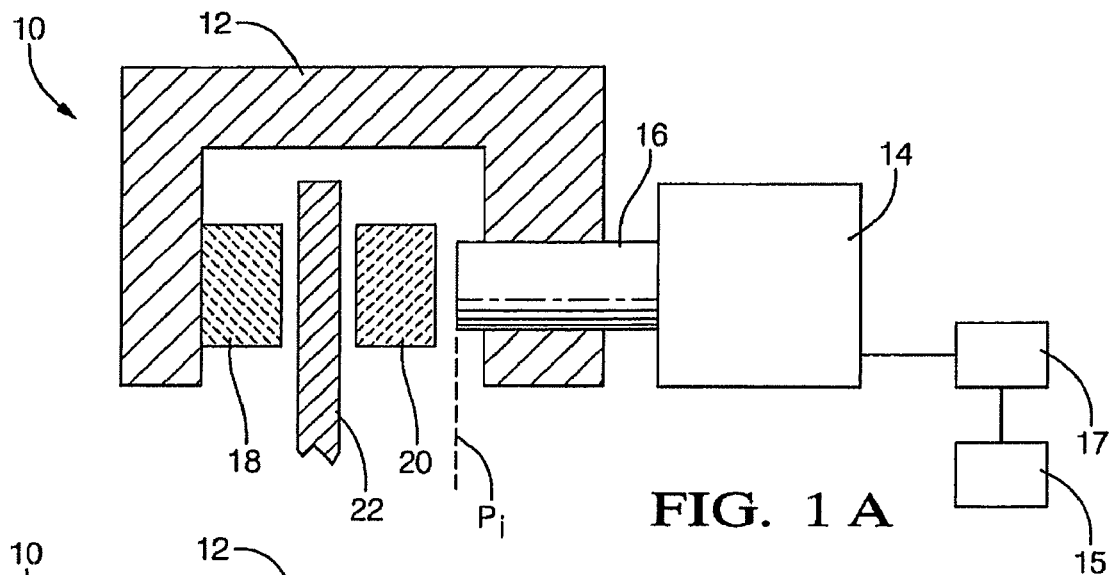
FIG. 1A is a schematic illustration of an electromechanical brake system according to one aspect of the low force level detection system and method.
Figure 1B:
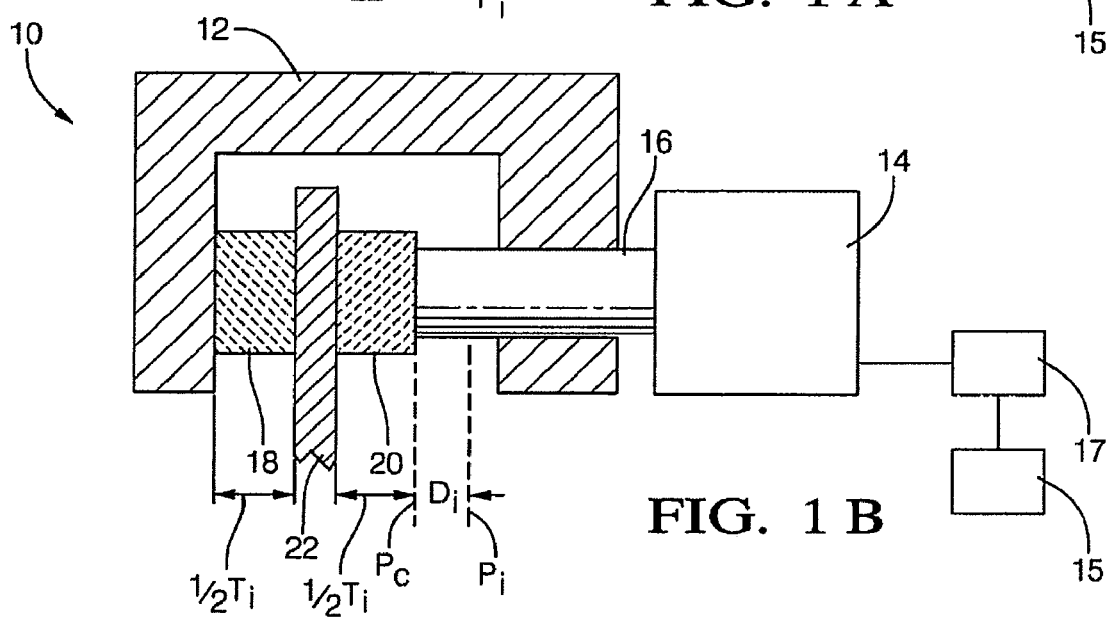
FIG. 1B is a schematic illustration of the electromechanical brake system of FIG. 1A with the actuator at a second position.

As shown in FIG. 1A, the disclosed low force level detection system and method is embodied in an electromechanical brake system, generally designated 10. Brake system 10 may include a housing 12, a motor 14 (e.g., an electric motor), a processor 15, a sensor 17, an actuator 16, two brake pads 18, 20, a rotor 22. The motor 14 may include a ball screw assembly and a gear train (not shown) that may translate the rotational force of the motor 14 into distal advancement of the actuator 16, thereby urging the actuator 16 linearly into engagement with the brake pads 18, 20. As the actuator 16 engages the brake pads 18, 20, the brake pads 18, 20 clamp the rotor 22 and supply a braking force to the rotor 22, as shown in FIG. 1B.

Figure 2:
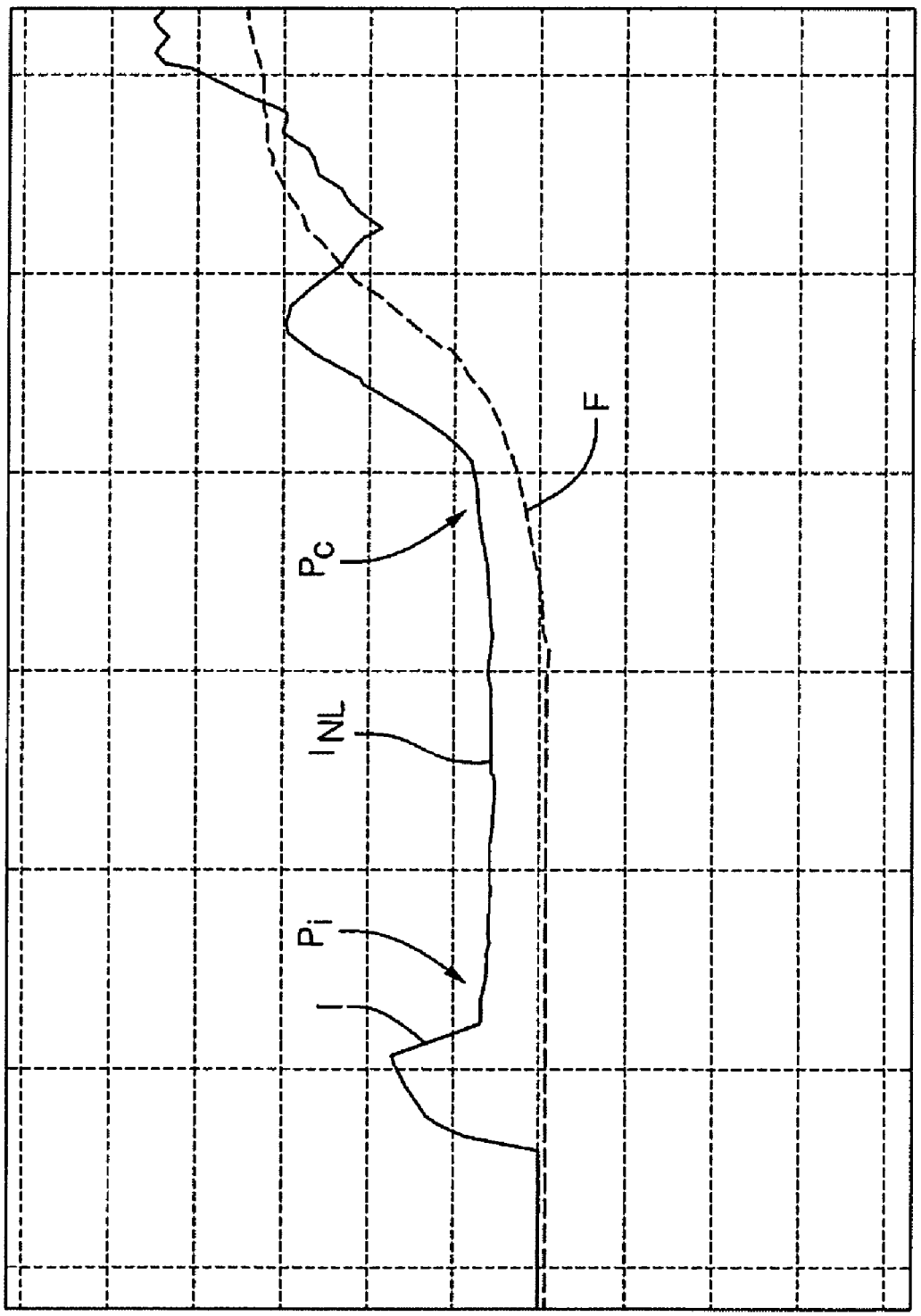
FIG. 2 is a graphical illustration of the low force level detection system and method showing clamping force and current plotted against position of the actuator.

As shown in FIG. 2, as the actuator 16 moves from its initial position $P_i$ (see also FIG. 1A) to the clamping position $P_c$ (see also FIG. 1B), the motor 14 may be generally in a no-load state (i.e., there is no clamping force exerted by the motor 14). In the no-load state, the no-load motor speed $\omega_{NL}$ (motor speed is not shown in FIG. 2) and the no-load motor current $I_{NL}$ may remain relatively constant when a constant voltage is applied across the motor 14. However, as the actuator 16 contacts the brake pads 18, 20 and initiates clamping of the rotor 22 (i.e., at position $P_c$), there may be a decrease in motor speed $\omega$ and a corresponding increase in motor current I. FIG. 2 graphically illustrates an example of the clamping force F relative to the motor current I when a constant voltage is applied across the motor 14, wherein there is a sudden increase in motor current I as the clamping force F begins to increase (i.e., beyond position $P_c$).

Accordingly, the following motor and actuator equations may be used to model the brake system 10:

$$J\dot{\omega} = K_T I - T_L - \mu\omega - T_C \quad \text{(Eq. 2)}$$

$$L\dot{I} = V - RI - K_E \omega \quad \text{(Eq. 3)}$$

wherein J is the inertia of the motor 14, ball screw and gear train, ω is the motor speed, $K_T$ is the motor torque constant, I is the motor current, $T_L$ is the load torque, μ is the dynamic friction in the motor 14, ball screw and gear train, $T_C$ is the cogging torque, L is the motor inductance, V is the source voltage, R is the motor resistance and $K_E$ is the EMF constant.

Assuming no load torque (i.e., $T_L=0$) when the motor 14 is in the no-load state, Eqs. 2 and 3 may be solved to yield:

$$\omega_{NL} = \frac{K_T V - RT_C}{\mu R + K_T K_E} \qquad \text{(Eq. 4)}$$

$$I_{NL} = \frac{\mu V + K_E T_C}{\mu R + K_T K_E} \qquad \text{(Eq. 5)}$$

Then, assuming $T_L=T_{F0}$ at a motor speed of $\omega_{F0}$ or a motor current of $I_{F0}$, Eqs. 2 and 3 may be solve to yield:

$$\omega_{F0} = \frac{K_T V - R(T_C + T_{F0})}{\mu R + K_T K_E} \qquad \text{(Eq. 6)}$$

$$I_{F0} = \frac{\mu V + K_E(T_C + T_{F0})}{\mu R + K_T K_E} \qquad \text{(Eq. 7)}$$

Combining Eqs. 4 and 6 yields:

$$\frac{\omega_{F0}}{\omega_{NL}} = \frac{K_T V - R(T_C + T_{F0})}{K_T V - T_C R} = 1 - \frac{T_{F0} R}{K_T V - T_C R} \qquad \text{(Eq. 8)}$$

and combining Eqs. 5 and 7 yields:

$$\frac{I_{F0}}{I_{NL}} = \frac{\mu V + K_E(T_C + T_{F0})}{\mu V + K_E T_C} = 1 + \frac{K_E T_{F0}}{\mu V + K_E T_C} \qquad \text{(Eq. 9)}$$

wherein $\omega_{F0}$ is the motor speed corresponding to clamping force $F_0$, $I_{F0}$ is the motor current corresponding to clamping force $F_0$ and $T_{F0}$ is the load torque at clamping force $F_0$.

Solving Eqs. 6 and 9 for $T_{F0}$ yields the following equations:

$$T_{F0} = \frac{1 - \frac{\omega_{F0}}{\omega_{NL}}}{R}(K_T V - RT_C) \qquad \text{(Eq. 10)}$$

$$T_{F0} = \frac{\frac{I_{F0}}{I_{NL}} - 1}{K_E}(\mu V + K_E T_C) \qquad \text{(Eq. 11)}$$

wherein, in one aspect, $K_T$, μ, $T_C$, V, R and $K_E$ may be presumed to be relatively constant.

Thus, the load torque $T_{F0}$ at clamping force $F_0$ may be determined by measuring the motor speed $\omega_{F0}$ relative to the no-load motor speed $\omega_{NL}$ and using Eq. 10 or, alternatively, by measuring the motor current $I_{F0}$ relative to the no-load motor current $I_{NL}$ and using Eq. 11.

Furthermore, the load torque $T_{F0}$ may be related to the clamping force $F_0$ as follows:

$$T_{F0} = F_0 G \qquad \text{(Eq. 12)}$$

wherein G is the gain. The gain G may be a function of the screw pitch, the gear reduction and/or the efficiency of the actuator. However, the gain G may be generally constant at relatively low clamping forces $F_0$.

Therefore, according to one aspect, the clamping force $F_0$ may be determined as follows:

$$F_0 = \kappa_1\left(1 - \frac{\omega_{F0}}{\omega_{NL}}\right) \qquad \text{(Eq. 13)}$$

or $$F_0 = \kappa_2\left(\frac{I_{F0}}{I_{NL}} - 1\right) \qquad \text{(Eq. 14)}$$

wherein $\kappa_1$ and $\kappa_2$ are constants. In one aspect, constants $\kappa_1$ and/or $\kappa_2$ may be determined graphically and/or by experimental data. In another aspect, constants $\kappa_1$ and/or $\kappa_2$ may be calculated by determining the various values of $K_T$, μ, $T_C$, V, R, $K_E$ and G.

At this point those skilled in the art will appreciate that various motor signals may be used according to the low force level detection system and method. For example, commutation time between motor position pulses and estimates of motor signals may be used.

Accordingly, the clamping force $F_0$ applied to the rotor 22 by the brake pads 18, 20 and the actuator 16 may be determined by measuring a motor signal value (e.g., motor speed or motor current) relative to the motor signal value at a no-load state using the sensor 17 such that the processor 15 may correlate the measured value into a clamping force value (i.e., a low force level).

In another aspect, the low force level detection system and method may provide a technique for estimating brake pad wear and/or the thickness $T_X$ of the brake pads 18, 20 at some subsequent time after use.

The brake system 10 may be provided with new or full brake pads 18, 20, wherein both brake pads 18, 20 and all linings have an initial thickness $T_i$. In one aspect, each individual brake pad 18, 20 may be presumed to have a thickness of about ½ of the total pad thickness $T_i$ (i.e., the initial thickness of each pad may be ½$T_i$). In another aspect, each brake pad 18, 20 may be presumed to wear generally equally.

Referring to FIGS. 1A and 1B, when the system 10 is provided with new or full brake pads 18, 20, the actuator 16 may have an initial position $P_i$ (i.e., a fully retracted position) and a clamping position $P_C$ (i.e., the position where the actuator 16 and brake pads 18, 20 initially begin to clamp the rotor 22). The actuator may be moved to the initial position $P_i$ by fully backdriving the actuator 16.

The nominal distance $D_i$ traveled by the actuator 16 from the initial position $P_i$ to the clamping position $P_C$ when the brake pads 18, 20 are new or full may be determined as follows:

$$D_i = P_C - P_i \qquad \text{(Eq. 15)}$$

Figure 1C:
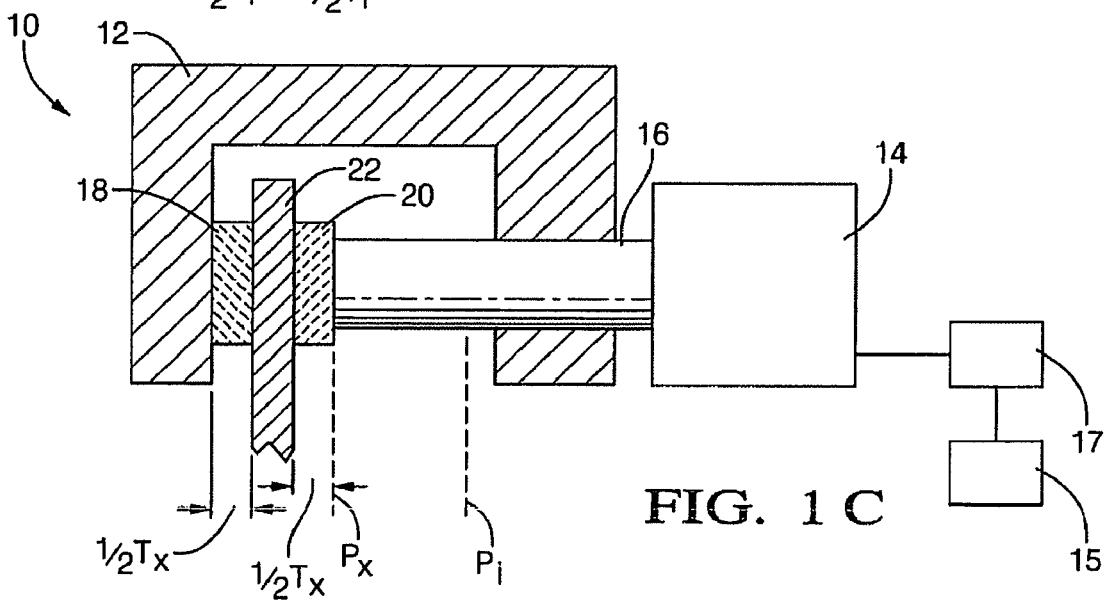
FIG. 1C is a schematic illustration of the electromechanical brake system FIG. 1A with the actuator at a third position.

As shown in FIG. 1C, after use and associated wear of the brake pads 18, 20, the actuator 16 must travel to position $P_X$ to initiate clamping. Accordingly, the thickness $T_X$ of the brake pads 18, 20 at some subsequent time after use may be determined as follows:

$$T_X = T_i - [(P_X - P_i) - D_i] \qquad \text{(Eq. 16)}$$

wherein, the total pad wear may be determined as follows:

$$\text{Total Pad Wear} = T_i - T_X \qquad \text{(Eq. 17)}$$

In one aspect, each pad 18, 20 may be presumed to have a thickness of about ½ $T_X$ at some subsequent time after use.

The positions $P_C$, $P_X$ of the actuator 16 at the onset of clamping may be determined using any known techniques. In one aspect, positions $P_C$, $P_X$ of the actuator 16 may be determined by monitoring motor signals, as discussed above. However, those skilled in the art will appreciate that any technique capable of determining positions $P_C$, $P_X$ may be used.

For example, the distance between the fully backdriven position of an actuator and the onset of clamping of a new pair of brake pads (total thickness of 20 mm) may be about 30 mm. After several months of use, the distance between the fully backdriven position of the actuator and the onset of clamping may be about 34 mm. Therefore, applying Eq. 16, the resulting pad thickness may be estimated to be about 16 mm (i.e., 20 mm−[(34 mm)−(30 mm)]), wherein each brake pad may be about 8 mm thick.

Although the low force level detection system and method is shown and described with respect to certain aspects, modifications may occur to those skilled in the art upon reading the specification. The low force level detection system and method includes all such modifications and is limited only by the scope of the claims.

What is claimed is:

1. A method for estimating a force value exerted by a brake pad onto a rotor comprising the steps of:
    providing an electric motor;
    actuating said electric motor to advance an actuator, said actuator being positioned to advance said brake pad into engagement with said rotor, wherein, upon actuation, said electric motor has a motor current;
    determining a first value of said motor current representative of a configuration in which said first body is disengaged from said second body during a no-load state of said electric motor;
    determining a second value of said motor current, said second value being different from said first value and representative of a second configuration in which said brake pad is engaged with said rotor during a load state of said electric motor; and
    calculating the force value according to $$F_0 = \kappa_2 \left( \frac{I_{F0}}{I_{NL}} - 1 \right),$$

wherein $\kappa_2$ is a constant and $I_{F0}$ is said second value of said motor current and $I_{NL}$ is said first value of said motor current.

2. The method of claim 1 wherein said force value is a clamping force.

3. The method of claim 1 wherein said first value is generally constant during said no-load state.

4. The method of claim 1 wherein said motor current increases during said no load state.

5. The method of claim 1 further comprising the step of estimating the thickness of said brake pad based at least upon an original thickness of said brake pad and a distance traveled by said actuator.

6. A brake system comprising:
    a rotor positioned between at least two brake pads;
    an actuator positioned to engage at least one of said brake pads to apply a clamping force to said rotor;
    an electric motor adapted to advance said actuator into selective engagement with at least one of said brake pads;
    at least one sensor in electrical communication with said electric motor for measuring a motor current of said electric motor; and
    a processor connected to said sensor, said processor being adapted to determine a first value of said motor current representative of a configuration in which said actuator does not engage said at least one of said brake pads and a second value of said motor current representative of a configuration in which said actuator does engage said at least one of said brake pads for calculating a force value according to $$F_0 = \kappa_2 \left( \frac{I_{F0}}{I_{NL}} - 1 \right),$$

wherein $\kappa_2$ is a constant and $I_{F0}$ said second value of said motor current and $I_{NL}$ is said first value of said motor current.

7. The system of claim 6 wherein said processor includes said sensor.

* * * * *